(12) United States Patent
Peng

(10) Patent No.: US 6,264,746 B1
(45) Date of Patent: Jul. 24, 2001

(54) CROSS-HEAD DIE

(75) Inventor: Hong Peng, Pickerington, OH (US)

(73) Assignee: Owens Corning Fiberglas Technology, Inc., Summit, IL (US)

( * ) Notice: Subject to any disclaimer, the term of this patent is extended or adjusted under 35 U.S.C. 154(b) by 0 days.

(21) Appl. No.: 09/260,706

(22) Filed: Mar. 2, 1999

(51) Int. Cl.$^7$ .................................................. B05C 3/12
(52) U.S. Cl. ........................ 118/405; 118/420; 118/429; 118/DIG. 18
(58) Field of Search .................................. 118/400, 404, 118/405, 420, 429, DIG. 18; 425/97

(56) References Cited

U.S. PATENT DOCUMENTS

| | | |
|---|---|---|
| 1,154,674 | 9/1915 | Van Ness . |
| 1,501,764 | 7/1924 | Flint . |
| 1,646,825 | 10/1927 | Kochendorfer . |
| 2,654,352 | 6/1953 | Gliss . |
| 2,740,989 | 4/1956 | Henning . |
| 4,134,715 | 1/1979 | Cueto . |
| 4,774,906 | * 10/1988 | Lu ........................................ 118/404 |
| 4,988,278 | 1/1991 | Mills . |
| 5,183,669 | 2/1993 | Guillemette . |
| 5,451,355 | 9/1995 | Boissonnat et al. . |
| 5,571,326 | * 11/1996 | Boissonnat et al. .................. 118/405 |
| 5,575,851 | 11/1996 | Abe et al. . |
| 5,679,157 | 10/1997 | Milliman . |

FOREIGN PATENT DOCUMENTS 2220 319  11/1973 (DE) .

* cited by examiner

Primary Examiner—Mark A. Osele
(74) Attorney, Agent, or Firm—Inger H. Eckert

(57) ABSTRACT

A cross-head die which is comprised of a die body with a flow chamber, a plurality of die cavities, die elements within the die cavities, communication between the die cavities and the flow chamber, a means for individual flow adjustment to each die cavity, and a means for axial motion of the filamentary member(s) through the die elements. The single flow chamber communicates to a plurality of die cavities through individual radial flow ports. The flow chamber is open at one end and closed at the other except for a cleaning hole. Within each of the radial flow ports resides a device for adjusting flow restriction. Within each die cavity is a cylindrical die piston. A gap created between the die piston and the die cavity defines a path for resin flow. The resin flow path is tapered to a point at which the filamentary member exits from a smaller cylindrical bore through the center of the die piston. The resin is deposited on the filamentary member as it moves through the die piston to produce a composite matrix strand.

13 Claims, 3 Drawing Sheets

CROSS-HEAD DIE

TECHNICAL FIELD AND INDUSTRIAL APPLICABILITY OF THE INVENTION

This invention relates to a cross-head die. More particularly, this invention relates to a cross-head die and flow chamber system capable of simultaneous coating of multiple wires or other elongated filamentary members uniformly with melted thermoplastic. The system provides for individual adjustment of resin flow to each die cavity, low initial cost, ease of cleaning, and high volume production capability.

BACKGROUND OF THE INVENTION

The present invention relates to the class of extruding apparatus commonly known as cross-head dies. One or more electrical wires or other elongated, filamentary members are moved axially through such apparatus as a flowable coating material is injected therein, and the coating material is applied in one or more substantially concentric layers to the filamentary member(s) as it exits the apparatus. This is the conventional manner of applying, for example, a plastic insulating layer to an electrical wire.

Cross-head die technology is normally used to produce an insulation layer surrounding an electrically conductive core filament. One inherent property of the process is the consistent ability to produce a uniform core-to-coating cross sectional area ratio. For this ability, the process has been recently adopted to manufacture cylindrical pellets containing long fiber glass cores surrounded by a thermoplastic matrix. Over 1000 lb./hr of composite material may be produced by simultaneously coating multiple glass strands using a multiple hole cross-head die. The invention revolutionizes the production of long fiber reinforced thermoplastic composites.

High quality long fiber composites require a consistent mass ratio of glass fiber to thermoplastic matrix. A mass ratio of 30 percent glass fiber to 70 percent thermoplastic resin is typical for the industry. Cross-head die technology, by maintaining stable cross-sectional areas and densities, produces an extruded, coated, fiber-reinforced matrix capable of segmentation into pellets. These pellets have consistent properties essential to the production of quality injection or compression molded products.

Prior art cross-head die apparatus typically comprises a plurality of elements cooperatively positioned within an axial bore of the body, and molten plastic is introduced through a radial bore. The elements are maintained in the desired relationship by mating, conically tapered surfaces.

Multiple filamentary members may be coated simultaneously by duplicating the axial bores in the body and the plurality of elements. The axial chambers communicate to a central flow chamber or manifold via a radial bore to receive a portion of the flowable resin.

Problems associated with prior art cross-head dies include, for example, low production rate, inequitable distribution of resin flow to each port, stagnation of flow within the flow chamber, difficulty in cleaning, and high initial cost.

Cross-head dies with single axial bores for the coating of elongated filamentary elements have limited volume production capability. The need for higher production rates led to the introduction of more complex, multiple cavity cross-head dies fed by a single flow chamber.

Flow chamber designs of multiple cavity cross-head dies vary greatly. Commonly known in the art "Fishtail" or "Headhanger" designs create stagnation points within the flow of resin. The stagnation points allow resin to collect and harden, producing clogged ports and costly downtime. The present invention eliminates stagnation points by providing a flow chamber with continuous linear flow. Each radial port is fed along a linear flow path with chamber termination at the final flow port. A single stagnation point may occur at the termination of the chamber. Chamber cleaning and removal of hardened material at this point is facilitated by removing a resin releasing screw located precisely at the potential stagnation. The linear flow chamber design reduces both the frequency of required cleaning and the difficulty in effecting such maintenance.

A limitation of the linear flow chamber is that resin head pressure drops along the flow path such that downstream radial ports receive less flow than upstream ports. This invention compensates for this limitation by providing variable restriction devices or adjustment screws at each port to balance the flow through each port. The adjustment screws allow individual control of resin flow to each port, whereby each filamentary member is coated evenly.

As a general rule, it is desirable to minimize the number of elements in a cross-head die. As with other structural assemblies, the parts reduction normally results in a reduction of initial cost, assembly and disassembly time, frequency of breakdowns and parts replacement. This assumes, of course, that the speed of operation, quality of final product, and the like are not compromised by elimination of certain elements. In particular, in operation of a cross-head die, it is essential to distribute the molten coating material evenly about the axially moving filamentary member.

In view of the foregoing, it is an object of the present invention to provide cross-head die assembly. It is another object of the present invention to provide a cross-head die assembly for applying a layer of coating material to a filamentary member moved axially through the die wherein the number of parts in the assembly is less than in prior art assemblies of the same class of apparatus. Another object is to provide a cross-head die of simplified design and generally lower cost than prior art apparatus of the same type. Yet another object of the present invention is to provide a cross-head die assembly capable of coating multiple filamentary members simultaneously. Still another object of the present invention is to provide a cross-head die assembly capable of high volume production. Still another object of the present invention is to provide a cross-head die assembly that requires a minimum of cleaning in operation. Yet another object of the present invention is to provide a cross-die assembly that may be easily and quickly repaired. A further object is to provide a cross-head die assembly with individual resin flow control to each radial port and axial bore.

SUMMARY OF THE INVENTION

Briefly, according to this invention there is provided a cross-head die which is comprised of a die body with a flow chamber, a plurality of die cavities, a plurality of die elements mounted within the die cavities to direct resin flow, communication between the die cavities and the flow chamber, a device for individual flow adjustment to each die cavity, and a means for axial motion of the filamentary member(s) through the die elements. In a preferred embodiment, a standard single screw extruder delivers thermoplastic resin to a single cylindrical flow chamber. The flow chamber communicates to 12 die cavities disposed beneath the chamber through individual radial flow ports.

The flow chamber is enclosed on each end by removable end caps. The downstream end cap is sloped to direct resin flow to the final radial port and has a sealable hole bored through it to facilitate flow chamber cleaning. A resin release screw seals this hole in normal operation. Within each of the 12 radial flow ports resides an adjustment screw to vary the port's cross-sectional area, and hence the effective restriction, of each port. The axial bores or die cavities are cylindrical to receive a cylindrical die piston. A cylindrical gap created between the die piston and the die cavity defines a path for resin flow. The flow path is conically tapered to a point at which the filamentary member exits from a smaller axial bore through the center of the die piston. The resin is deposited on the filamentary member as it moves through the die cavity to produce a composite matrix strand. Resin flow is distributed equally to each die cavity by the flow chamber. Subsequent processing of the composite strand may include cooling and segmenting into pellets.

BRIEF DESCRIPTION OF THE DRAWINGS

Further features and other objects and advantages will become clear from the following detailed description made with reference to the drawings in which.

DETAILED DESCRIPTION AND PREFERRED EMBODIMENTS OF THE INVENTION

Figure 1:
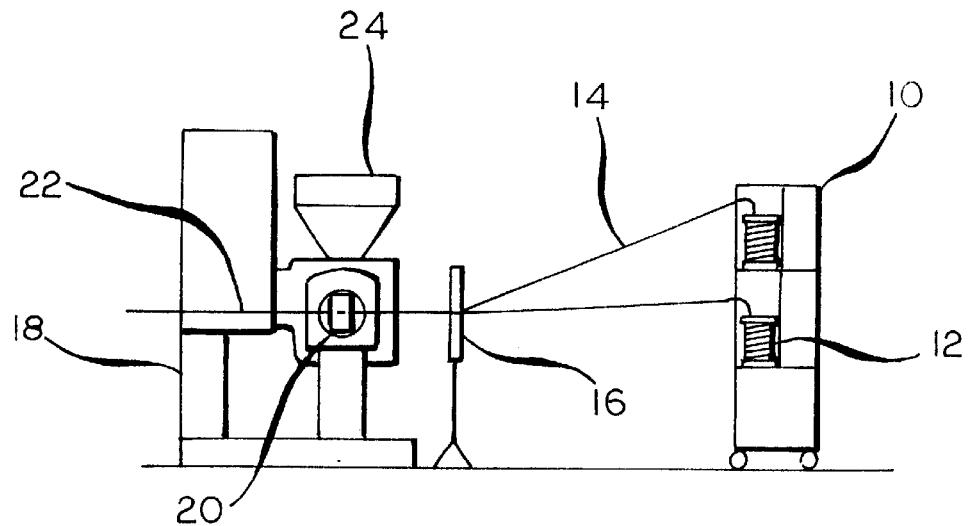
FIG. 1 is a front view of the invention in a operative environment with a single screw extruder and creel with glass packages.
Figure 2:
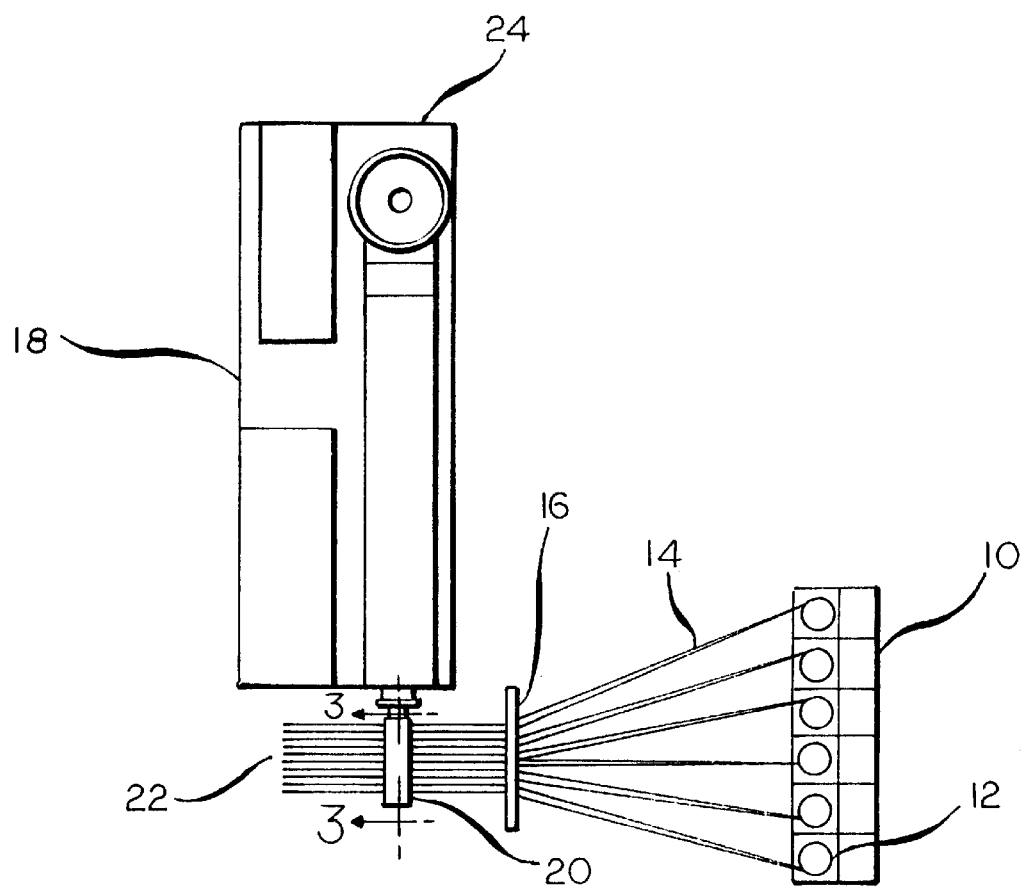
FIG. 2 is a plan view of the apparatus of FIG. 1.

In FIG. 1 and FIG. 2, at least one glass package or spool 12 is loaded on creel 10 for processing through the cross-head die 20. Each glass strand 14, preferably a multiplicity of strands, is drawn through a strand guide 16. The strand guide 16 aligns the glass strands 14 for passage through the cross-head die 20 having a construction according to the invention.

The fiber reinforcement suitable for use in the present invention may be selected from a wide variety of materials. The primary constraint is that the fiber must not decompose prior to reaching the processing temperature for the resin selected as the matrix material. Glass fibers such PERFORMAX™, carbon fibers, and aramid fibers are preferred. Continuous length fiber in the form of a roving, spool, or glass package are preferred.

The fibrous glass filamentary member(s) may take a variety of forms. The preferred material is PERFORMAX™, a trademark of Owens-Corning Fiberglas Technology Inc. PERFORMAX™ is provided in spool packages 12 in a ribbon form. Curling the 1/16 inch to 1/2 inch wide ribbon into a roll approximately 1/32 to 1/8 inch in diameter forms the filamentary member 14. The curling takes place as the member is drawn into the die piston's axial hole 34. Unlike electrical conductor coating, the final composite coated strand 22 does not require the filament to be precisely located along the axial centerline of the coated strand 22. A typical coated strand 22 is 1/16 to 1/4 inch in diameter and comprises 20–70 percent glass content by weight. 30 percent is typical. The coated strand 22 may be cut into 1/4 to 1 inch long pellets for subsequent compression or injection molding use.

Suitable thermoplastic resins useful for forming the continuous thermoplastic matrix are well known. For example, polyolefins such as polypropylene can be used. Polyesters, PVC, polycarbonates, polycarbonate/ABS alloys (such as CYCOLOY®), and polyamides such as NYLON™ can also be used. High performance thermoplastics, the so-called engineering plastics, such as polyether-ether ketone (PEEK), and polyetherimide (such as ULTEM®), and polyphenylene diketone (PPDK) are also suitable.

The thermoplastic resin is loaded into resin hopper 24 and transformed into a molten feed material by a single screw extruder 18 or the like.

Generally speaking, the material feed to the cross-head die 20 will contain on the order of from about 20 to about 70 percent, by weight, of reinforcing filaments 14, the remainder of the feed being the thermoplastic matrix material. Preferably, the cross-head die 20 includes electrical resistance heaters 36, 37 and is generally maintained at a temperature in the range of from about 170° C. to about 350° C. Typical temperatures range from about 180° C. to about 300° C. Functionally speaking, the die 20 will be maintained at a temperature which is sufficient, at the pressures found within the die, to soften the polymer sufficiently to wetout the reinforcing fibers and form a continuous thermoplastic matrix having no visible voids or splits. Usually, the die 20 will be maintained at a temperature in the range of from about 10° C. to about 100° C. above the softening point of the polymer selected. One or more thermocouples 35 or equivalent temperature measuring devices are used to monitor and control die 20 temperatures.

Figure 3:
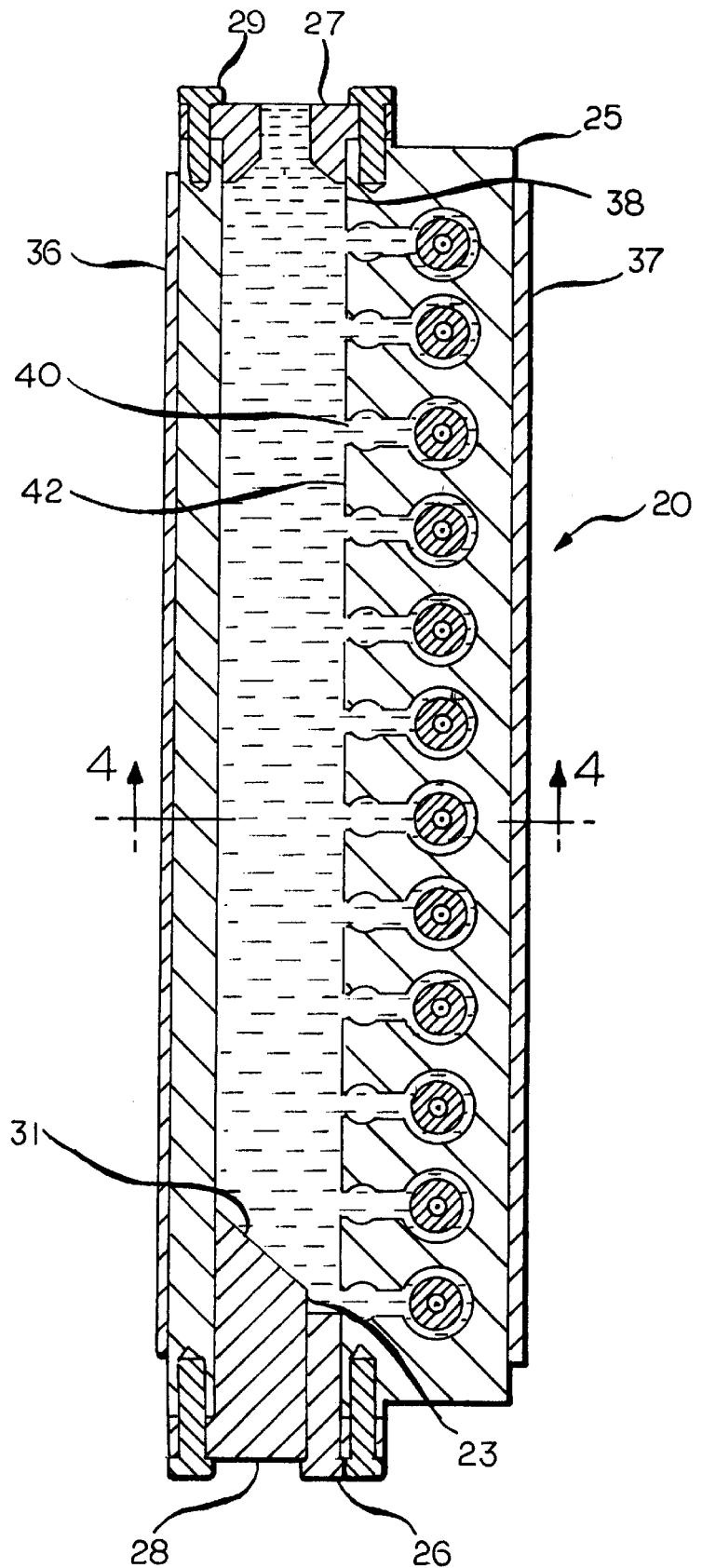
FIG. 3 is a longitudinal section view showing the flow chamber and a plurality of flow ports and die cavities.
Figure 4:
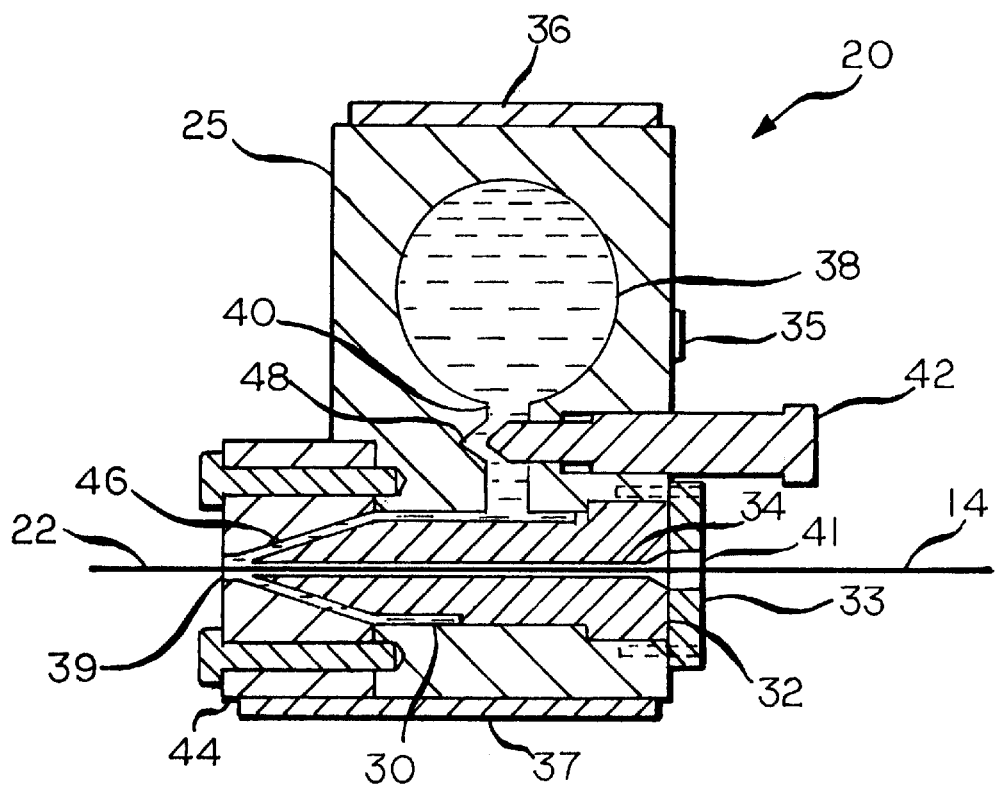
FIG. 4 is section view of a single die cavity and the die elements.

With reference to FIGS. 3 and 4, the cross-head die 20 includes a die body 25. The die body 25 is an elongate block preferably of stainless steel or other corrosion and temperature resistant, machineable material. An important feature of the die body 25 is the full-length flow chamber 38. As shown in both FIG. 3 and FIG. 4, the flow chamber 38 is a cylindrical passage through the full length of the elongate block of the die body 25. The flow chamber 38 opens at each end of the die body 25.

Disposed within the flow chamber 38 are two end caps 27 and 28. The inlet end cap 27 has a cylindrical projection that approximates the diameter of the flow chamber 38 and a flange that extends beyond the diameter of the flow chamber. The cylindrical projection is inserted into the flow chamber 38 concentric with the chamber. The exterior flange is used to fasten the end cap 27 to the die body 25 using threaded fasteners or the like. The end cap 27 allows communication between the flow chamber 38 and the exterior of the die body 25 through inlet hole 29 located concentric with the flow chamber. Thermoplastic resin is delivered to the inlet hole 29 from the extruder 18 and flows through the flow chamber 38 as indicated.

Within the flow chamber 38, opposite from the inlet end cap 27, is the cleaning end cap 28. Similar to the inlet end cap 27, the cleaning end cap 28 has a cylindrical projection approximating the diameter of the flow chamber 38 and a flange larger than the chamber. The cylindrical projection has two unique features, a sloped face 31 and a threaded cleaning hole 23. The cylindrical projection is inserted in the flow chamber 38 such that the sloped face 31 is oriented to direct resin flow into the adjacent resin flow port 40. The cleaning hole 23 is located parallel to and through the cylindrical projection of the cleaning end cap 28 at the center of the sloped face's 31 thinnest cross-section. The end cap 28 is positioned such that the thinnest cross-section is adjacent to the flow port 40. This positioning locates the cleaning hole 23 adjacent to the resin flow port 40 where any stagnant or hardened resin flow could accumulate. The cleaning hole 23 is threaded to mate with resin release screw 26, which seals the cleaning hole during normal operation. The cleaning end cap 28 is fastened to the die body 25 through the external flange using threaded fasteners or the like.

In communication with the flow chamber 38 are a plurality of radially directed resin flow ports 40. In FIG. 3, 12 such flow ports 40 are shown evenly spaced linearly along the full length of the flow chamber 38. The axes of the flow ports 40 are parallel to each other, perpendicular to the axis of the flow chamber 38, and directed towards the die cavities 30. In operation, the flow ports 40 provide 12 individual flow paths for the thermoplastic resin from the flow chamber 38 to the die cavities 30.

FIG. 4 illustrates a cross section through a single die cavity 30 of the die body 25. The flow chamber 38 is shown perpendicular to the plane defined by the page. The flow port 40 is directed radially away from the flow chamber 38, vertically downward toward the die cavity 30. The die cavity 30 is a cylindrical chamber through the die body 25 with an axis perpendicular to both the flow chamber 38 and the flow port 40. 12 die cavities 30 are located along the length of the die body 25 such that their axes are coincident with the flow port 40 axes. The die cavity(s) extend completely through the die body 25.

Interposed between the flow chamber 38 and the die cavity 30 is a smaller cylindrical adjustment cavity 48. The adjustment cavity 48 extends forward from the rear of the die body 25, intersects flow port 40, and ends beyond the flow port without extending through the die body. The adjustment cavity 48 is parallel to the die cavity 30 and is threaded to accept adjustment screw 42. In operation, the adjustment screw 42 is inserted into the adjustment cavity 48 so that the end of the adjustment screw interferes with the cross sectional area of the flow port 40. By varying the depth of the adjustment screw 42, the flow resistance of each flow port 40 may be varied so that the resin flow to each of the die cavities 30 is equal.

The device used to vary the resistance of each flow port is not limited to an adjustment cavity 48 and adjustment screw 40. Any type of variable restriction may be employed. For example, a variable orifice, damper, check-valve, springloaded valve, or flexible diaphragm valve may be used.

Complete die cavities are formed when the die head 44 is attached to the die body 25. Cylindrical die cavity 30 is aligned with conical die cavity 46 to form a complete die cavity with a tapered end. The die head 44 is positioned adjacent to the die body 25 such that the conical die cavity 46 is concentric with the die cavity 30. The die head 44 is attached to the die body 25 with threaded fasteners or the like such that there is no resin leakage from the complete die cavity. At the tapered end of the conical die cavity 46, there is located a concentric exit hole 39 through the die head 44.

Disposed within each complete die cavity is a die piston 32. The die piston 32 has a cylindrical die piston body 56 with a conical die tip 54. The die piston 32 is located concentric with the die cavity 30 and conical die cavity 46 and is retained using an attachment plate 33 located adjacent to the die body 25 opposite to the die head 44. The attachment plate 33 is affixed to the die body 25 using threaded fasteners or the like and is located such that an entry hole 41 through the plate 33 is concentric with the die cavity 30. When installed within the complete die cavity, the die piston's 32 conical die tip 54 is positioned such that the gap defined by the exterior of the die piston 56, 54 and the interior walls of the die cavity 30, 46 form a circumferential flow path conically tapering toward exit hole 39.

Figure 5:
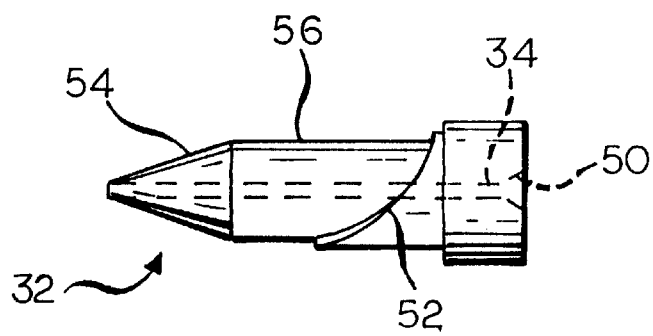
FIG. 5 is a side detail view of a single die piston.

FIG. 5 illustrates the detail design of the die piston 32. The cylindrical body of the die piston has 3 diameters. The major diameter is larger than the die cavity 30 and is used as a position stop as the die piston is inserted into a counter-bore machined into die body 25 from the rear. The mediate diameter is substantially equal to the die cavity 30 diameter and is used to position the piston concentric within the die cavity. The minor diameter, piston body 56, is concentric with the die cavity 30 and in cooperation with the die cavity defines a cylindrical flow path. The resin flow is directed towards the exit hole 39 by an incurvate flow guide 52 formed at the intersection of the piston body 56 and the die piston's 32 mediate diameter.

The movement path of the elongate filamentary glass strand 14 is defined by a cylindrical piston hole 34 bored through the die piston 32 along its longitudinal axis. The entrance to this piston hole 34 may be beveled as shown by hole bevel 50 to reduce glass strand 14 damage. A preferred glass strand 14 is shaped as a ribbon. This ribbon is curled into a roll by the piston hole 34 as the strand 14 enters the piston hole 34 at hole bevel 50. The hole bevel 50 reduces the stress on the glass fibers as the ribbon is curled.

The coated strands 22 are withdrawn from the cross-head die 20 by a pulling means such as a gripping, pulling mechanism of the type commonly used in cross-head die processing. Alternatively, one may use a rotating mandrel upon which material could be spooled or which could be utilized to filament wind a fiber reinforced thermoplastic object. Where the mandrel carries a spool, the material taken up is usually referred to as a prepreg, which can be cut into pellets and compression or injection molded to form long fiber composites of great structural strength. Additionally, equipment may be added between die 20 and the pulling mechanism to cool and otherwise post-treat the coated strand(s) 22.

Electrical resistance heaters affixed to the external surfaces of the die body 25 heat the die body. FIG. 3 and FIG. 4 illustrate both upper and lower heaters 36 and 37 respectively. An optional construction includes a plurality of electrical resistance heaters inserted into one or more transverse passages extending through die body 25. One or more thermocouples 35 are affixed to die body 25 for the monitoring and regulation of die temperature.

In operation, the glass strand 14 is drawn through the cross-head die 20 at a line speed generally ranging from about 3 to about 195 inches/second, usually in the range of from about 6 to about 60 inches/second. Residence time in the cross-head die 20 generally ranges from about 0.015 second up to about 1 second and varies with the cross section of the article and the softening point of the resin employed. The die 20 has a sufficiently high temperature to soften the thermoplastic matrix and sufficiently small exit hole 39 to form the matrix into a uniform coated strand 22. Preferably, the coated strand 22 exiting the die 20 is cooled by a cooling device, for example, a water cooling bath, so that the cross-sectional configuration of exit hole 39 is replicated in the product taken up on mandrel.

Replacement glass packages 12 may be loaded on the creel 10 and threaded into the piston hole 34 while the process is in operation. The axial motion of the original strand 14 draws the second strand into the passage and the original strand is then cut. A more common method of introducing a new glass package 12 is by splicing the trailing end of the original package to the leading end of the new glass package. Preferably, shreds of the thermoplastic matrix are used as the splicing material so that the finished composite does not contain foreign contaminates. No interruption in the process is required to replace glass packages 12.

Die body 25 is best manufactured in one piece. The flow chamber 38, die cavities 30, and adjustment cavities 48 may be bored into the surface of the die body 25. The flow ports 40, however, originate radially from the flow chamber 38. As the flow ports as shown in FIG. 4 are not easily created from within flow chamber 38, they may be produced by boring from the exterior of die body 25, radially through the flow chamber 38, into the die cavities 30. The resulting radial bores that allow communication between the flow chamber 38 and the exterior of the die body 25 are then plugged such that no communication is possible.

Alternatively, the die body 25 may be constructed in two sections (not shown). An upper section includes the flow chamber 38 and a lower section includes the die cavities 30. The adjustment cavities 48 may be located in the upper or lower section. The upper and lower sections of the die body 25 are fastened such that the flow ports 40 are not restricted by misalignment. Threaded fasteners or the like may be used to secure the two sections.

All components of the cross-head die 20 are to be secured such that there is no leakage of thermoplastic resin between die elements except as specified by this disclosure or the referenced Figures.

It will, of course be understood that various details of construction may be varied through a wide range without departing from the principles of this invention and it is, therefore, not the purpose to limit the patent granted herein otherwise than necessitated by the scope of the appended claims.

What is claimed is:

1. A cross-head die for coating a plurality of filamentary members with thermoplastic resin comprising:
    an elongate main body;
    a flow chamber located within the main body having one end in communication with the exterior of the main body and the other end closed;
    a plurality of flow ports in communication with the flow chamber;
    a plurality of die cavities, each in communication with one flow port opposite the flow chamber;
    a plurality of die elements disposed within each die cavity whereby they direct resin flow and guide the filamentary member;
    one or more electrical resistance heaters attached to the main body;
    a device for measuring the temperature of the cross-head die or the resin; and
    wherein the closed end of the flow chamber is sloped towards an adjacent flow port and has a sealable opening, whereby the adjacent flow chamber may be cleaned.

2. The cross-head die of claim 1 wherein the plurality of flow ports each have individual device for adjusting flow restriction.

3. The cross-head die of claim 2 wherein the individual device for adjusting flow restriction is a threaded adjustment screw.

4. The cross-head die of claim 2 wherein the die elements within each die cavity include a cylindrical die piston with an axial hole through its entire length.

5. A cross-head die for coating a plurality of filamentary members with thermoplastic resin comprising:
    a plurality of cylindrical die pistons having an axial hole therein, a conically tapered end, and an incurvate flow guide;
    a cylindrical die cavity surrounding each die piston bounded on one end by the cylindrical piston and on the other end by a conically tapered cavity with a hole located on the axis;
    a radial port in communication with each die cavity directed away from the cavity;
    a device for restricting flow within each radial port;
    a single flow chamber in communication with all of the radial ports, with two ends;
    one end of the flow chamber being open to the exterior;
    the other end of the flow chamber closed adjacent to a radial port;
    the flow chamber disposed within an elongate body whereby the body provides the structural support for all die elements; and
    wherein the closed end of the flow chamber is sloped towards the adjacent flow port and having a sealable opening for cleaning an interior of the flow chamber.

6. The cross-head die of claim 5 wherein the device for restricting flow is a threaded adjustment screw.

7. The cross-head die of claim 5 wherein the elongate body is comprised of two sections, one section substantially supporting the flow chamber, the second section substantially supporting the die cavities.

8. The cross-head die of claim 5 with a device for heating the elongate body.

9. The cross-head die of claim 8 wherein the device for heating the elongate body is comprised of an electric resistance heater.

10. The cross-head die of claim 9 with a device for controlling the electrical heater.

11. The cross-head die of claim 10 wherein the device for controlling the electrical heater is a thermocouple attached the elongate body.

12. A cross-head die for coating a plurality of filamentary members with thermoplastic resin comprising.
    an elongate main body;
    a flow chamber located within the main body having one end in communication with the exterior of the main body and the other end closed, wherein the closed end of the flow chamber is sloped towards an adjacent flow port and has a sealable opening whereby the adjacent flow chamber may be cleaned;
    a plurality of die cavities formed in said main body, each in communication with one flow port opposite the flow chamber; and
    a plurality of die elements disposed within the die cavities, whereby an exterior of a die element and an interior of a corresponding one of the die cavities defines a resin flow path.

13. The cross-head die of claim 12, wherein one of said flow ports has an individual device extending only through said one flow port for adjusting flow restriction.

* * * * *